United States Patent [19]
Cox et al.

[11] Patent Number: 5,593,249
[45] Date of Patent: Jan. 14, 1997

[54] DIVERLESS FLOWLINE CONNECTION SYSTEM

[75] Inventors: David S. Cox, Hilarys Wa; Stephen M. Gates, Gooseberry Hill Wa, both of Australia

[73] Assignee: Sonsub, Inc., Houston, Tex.

[21] Appl. No.: 433,240

[22] Filed: May 2, 1995

[51] Int. Cl.⁶ ........................... F16L 1/12
[52] U.S. Cl. ........................... 405/191; 405/169; 405/170
[58] Field of Search ........................... 405/169, 170, 405/171, 191; 166/343

[56] References Cited

U.S. PATENT DOCUMENTS

| | | | |
|---|---|---|---|
| 3,367,299 | 2/1968 | Sayre, Jr. | 405/191 X |
| 4,010,619 | 3/1977 | Hightower et al. | 405/191 |
| 4,030,434 | 6/1977 | Pedlar et al. | 405/191 X |
| 4,436,449 | 3/1984 | Smoot et al. | 405/170 |
| 4,457,378 | 7/1984 | Watkins | 166/347 |
| 4,459,065 | 7/1984 | Morton | 166/343 X |
| 4,579,480 | 4/1986 | Szabo et al. | 405/169 |
| 4,682,913 | 7/1987 | Shatto et al. | 405/191 X |
| 4,906,136 | 3/1990 | Norbom et al. | 405/191 X |

OTHER PUBLICATIONS

Sonsub Services Pty. Ltd., Australia Patent Specification for "Flowline Connection System," published May 20, 1993.

*Primary Examiner*—Tamara L. Graysay
*Assistant Examiner*—Tara L. Mayo
*Attorney, Agent, or Firm*—Pravel, Hewitt, Kimball & Krieger

[57] ABSTRACT

A diverless flowline connection system for connecting a flowline to a subsea wellhead or other subsea structure. The diverless flowline connection system is used with a remotely operated vehicle. The diverless flowline connection system includes a frame assembly including clamping arms for mounting the frame assembly to the flowline. A pair of winches are mounted to the frame assembly. Each winch includes a winch line for attachment to the wellhead to which the flowline is to be connected. Each winch is independently controlled so that the lateral position of the flowline may be variously adjusted by controlling each of the winches. The diverless flowline connection system is of modular design to accommodate a wide variety of flowline diameters. The connection system can also be used to pull from the wellhead. Winch line guillotines are provided for severing the winch lines and the clamping arms release the flowline in the event of hydraulic system failure.

16 Claims, 7 Drawing Sheets

DIVERLESS FLOWLINE CONNECTION SYSTEM

BACKGROUND OF THE INVENTION

1. Field of the Invention

The present invention relates to a system for connecting a flowline to subsea hardware, and more particularly for remotely connecting a flowline to a wellhead connection or other subsea structure.

2. Brief Description of the Related Art

Flowlines used to connect subsea well completions or subsea manifolds to a production facility are generally deployed to the seafloor independently of other hardware. During the well tie-in phase the flowlines must be pulled from their laydown position to the subsea tree and then connected to the tree. This operation has traditionally been accomplished by divers using a combination of rigging and gantries on the subsea structure, although in deeper water a number of diverless connections have been achieved.

There are three main methods for performing a diverless flowline connection as follows:

(1) Surface Connection/Lay Away

The flowlines are passed from the lay vessel to the drill rig and connected to the tree on the surface, and leak tested. The tree is then "run" down the guidewires and established on the wellhead. The lay vessel lays the flowline away from the tree allowing the other end of the flowline to be connected on the surface.

(2) Subsea Connection/Lay Away

The tree is established on the wellhead by the drill rig. The flowlines are passed from the lay vessel to the drill rig. The flowline ends are then run down guide wires on the tree to align the pipe flange with the tree flowline connection hubs. A flowline connection running tool is then deployed down the guidewires and operated hydraulically to perform the connection subsea.

(3) Laydown/Subsea Connection

Remote pull-in and connection methods are used to complete the flowline connection. This is generally performed after the flowline has been laid on the seabed.

Methods (1) and (2) have a reasonable track record, however, they both suffer the disadvantage of relying upon the drillship and flowline lay vessel being in position in the field at the same time. For multiple well developments this is generally a cost exposure that is uneconomical. Method (2) also requires a large equipment/support area on the subsea structure which complicates the design and increases costs.

In method (3) the flowline is first laid on the seabed to within a short distance, typically to within fifty meters of the wellhead, and then the end of the flowline is pulled along the seabed and engaged to the wellhead connection. The flowline, although flexible, is relatively rigid at the end thereof. Thus, it is necessary that the end of the flowline be brought into proximity with the wellhead connection at the correct angle so that accurate engagement can take place.

Australian Patent Application Serial No. 28509/92 titled "Flowline Connection System," published May 20, 1993, discloses a module for connection to a remotely operated vehicle (ROV). The module attaches to the end of the flowline in a predetermined direction. A single winch system is mounted to the module and includes a winch line for attachment to the wellhead connector so that as the winch pulls in the winch line, the module is pulled towards the wellhead. The module includes a lateral thruster to laterally adjust the position of the module.

It is desirable to have a diverless flowline connection system adapted for use by either mounting the apparatus to the flowline and pulling the flowline to the connector or attaching the apparatus to the subsea manifold/template and winching the flowline to the connector. It is also desirable to have a winching system which allows for a balanced pull force through the centerline of the flowline and which will not put a moment on the flowline during final pull-in. Additionally, it is desirable to have a winch system which permits controlled application of a moment on the flowline to assist in the alignment of the flowline with the connector on the manifold/template. It is also desirable that the apparatus be modular to accommodate various flowline diameters, be light-weight, and include automatic release mechanisms upon power failure.

SUMMARY OF THE INVENTION

The diverless flowline connection system (DFCS) is a specialized remotely operated tool for connection of submerged flowlines to a subsea structure, as for example a wellhead or template. The DFCS can be used in two operational tie-in configurations: 1) pull from flowline end, or 2) pull from subsea structure.

The DFCS includes a skid frame for containing a pair of winches, at least two pair of flowline clamp arms, winch line guillotines and pinch rollers, a damper/alignment assembly and a hydraulic manifold.

The DFCS is modularly constructed to provide flexibility to pull-in a variety of different flowline sizes.

The DFCS includes a dual winch system which allows for a balanced pull force through the center of the flowline which will not put a moment on the flowline during final pull-in. The dual winch system includes independent controls of the winches to permit controlled application of a moment on the flowline to assist in the alignment of the flowline with the connector on the wellhead or subsea structure. This allows the DFCS to laterally adjust the position of the flowline and the DFCS as it approaches.

The DFCS utilizes the ROV hydraulic power unit with only hydraulic hoses as the power/control interface between the ROV and the DFCS. By using the ROV hydraulics, the DFCS avoids the extra weight of a second hydraulic power unit. The less weight on the DFCS skid avoids additional buoyancy requirements and improves the maneuverability of the ROV when attached to the DFCS.

The DFCS also includes release mechanisms to release the DFCS from the flowline and subsea structure in the event of power failure. One release mechanism is the winch line guillotine which severs the winch line in the event of power failure. Another release mechanism releases the grip of the clamp arms in the event of power failure.

BRIEF DESCRIPTION OF THE DRAWINGS

A better understanding of the invention can be had when the following detailed description of the preferred embodiment is considered in conjunction with the following drawings, in which.

3

Figure 3:
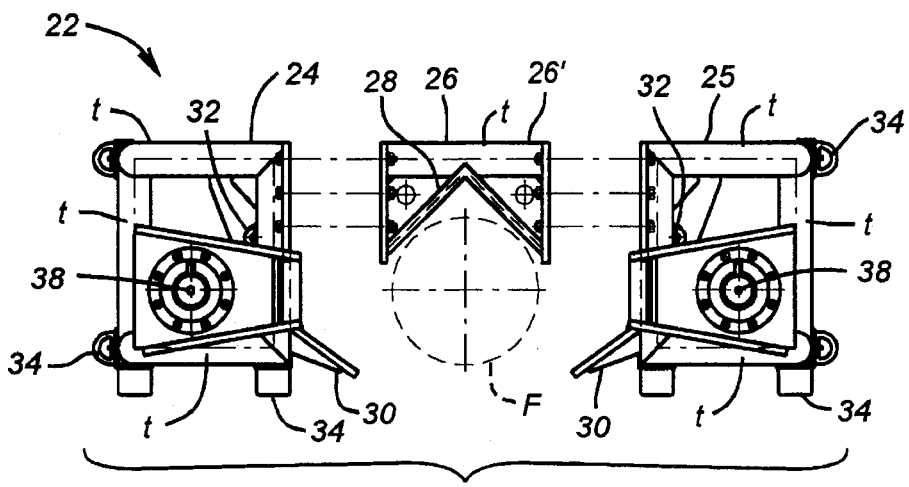
Figure 4:
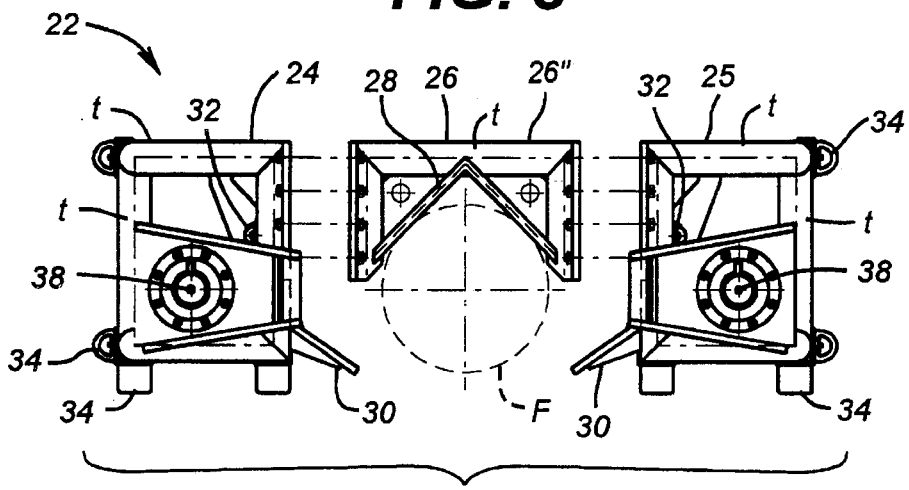
Figure 5:
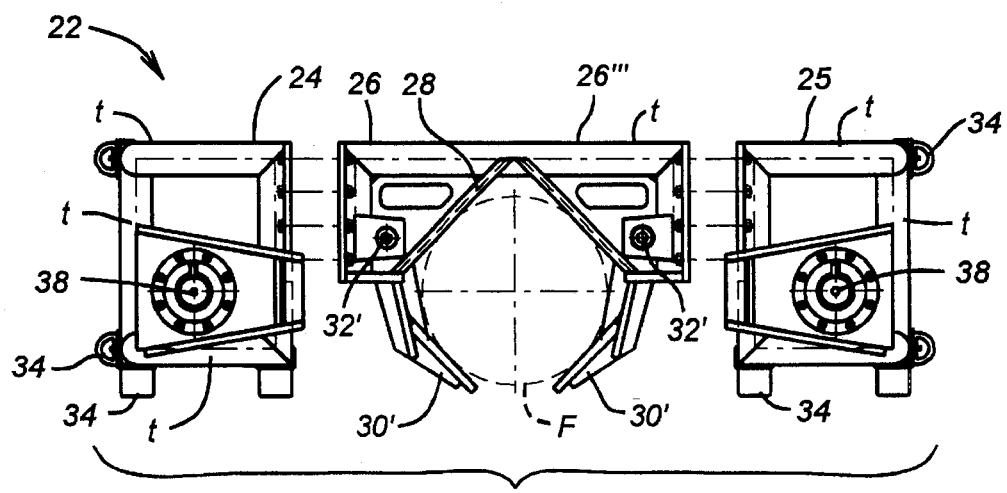
Figure 6:
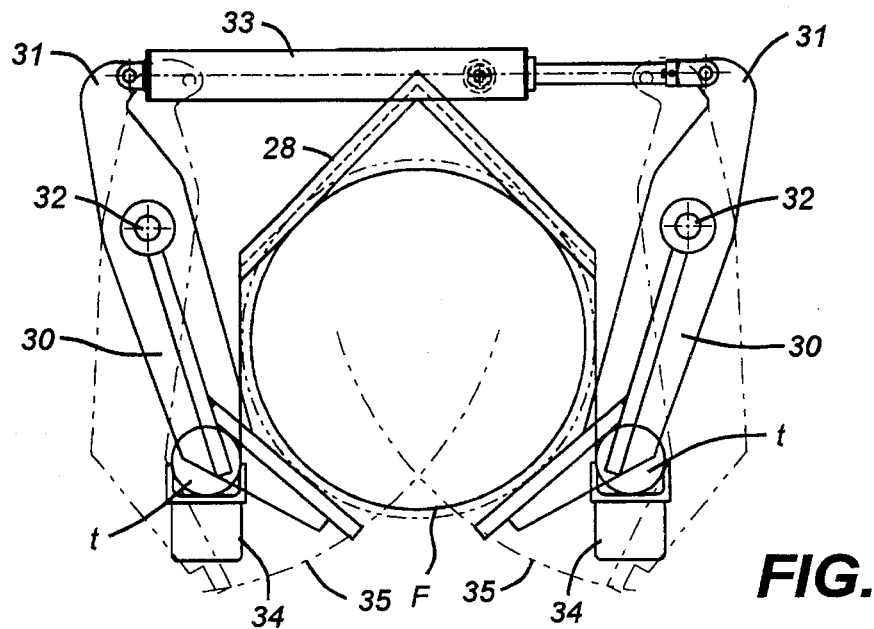
Figure 7:
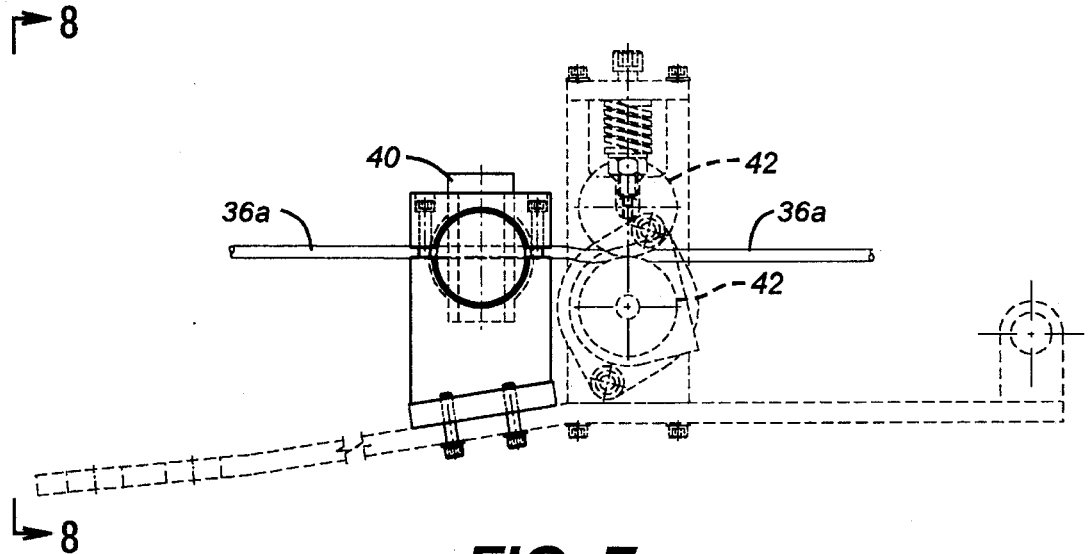
Figure 8:
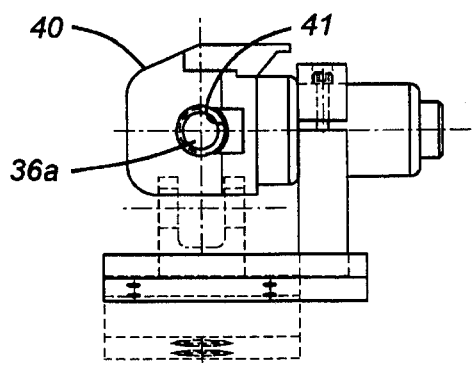
Figure 9:
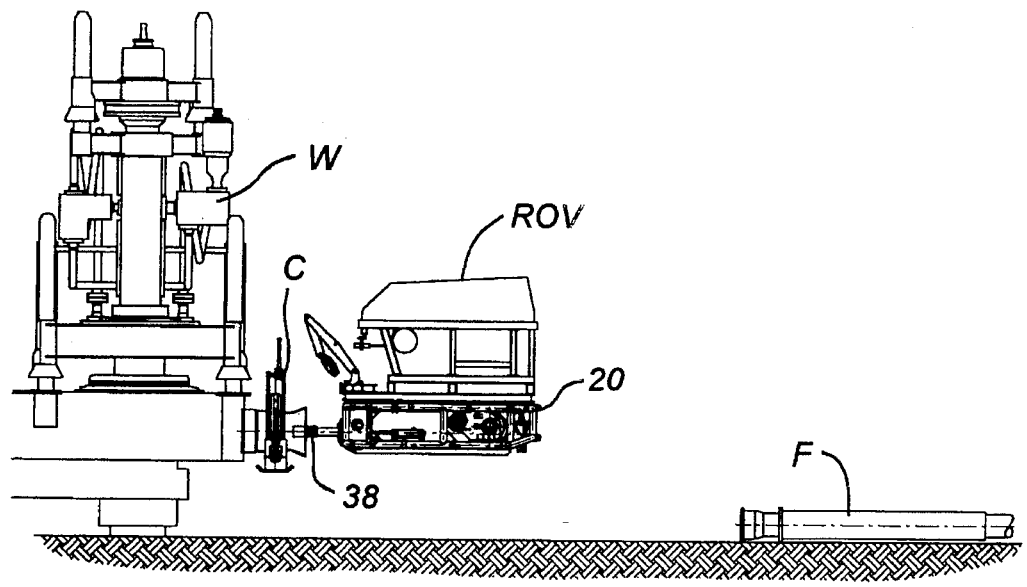
Figure 10:
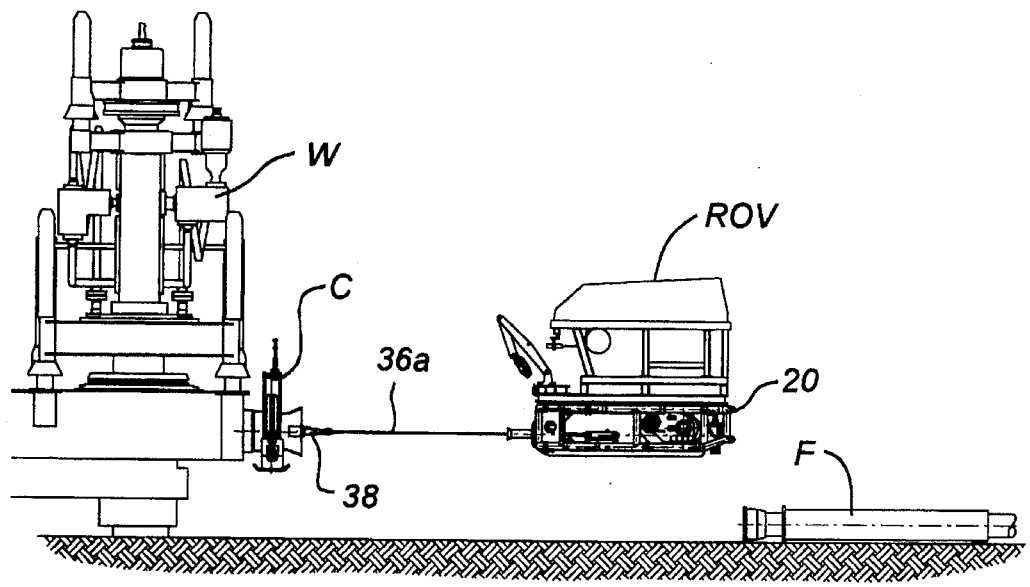
Figure 11:
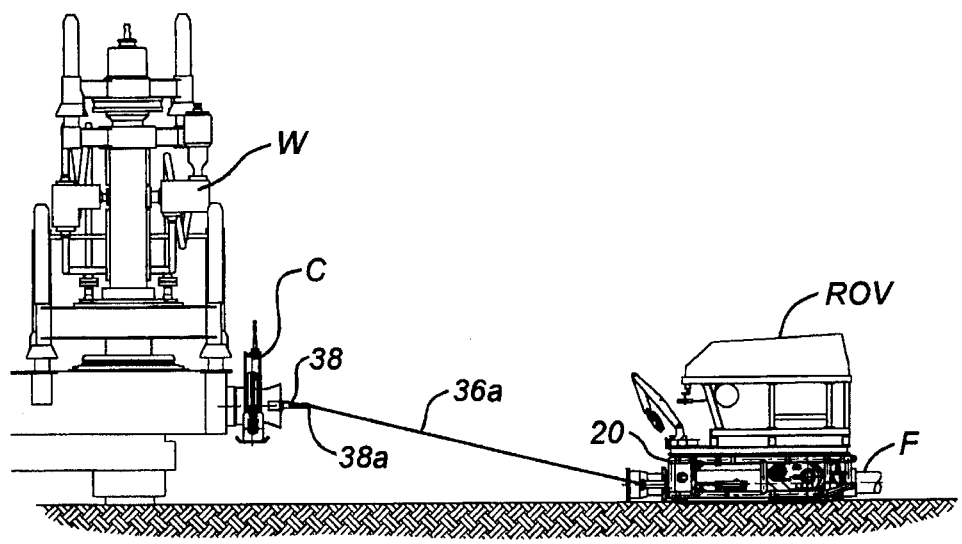
Figure 13:
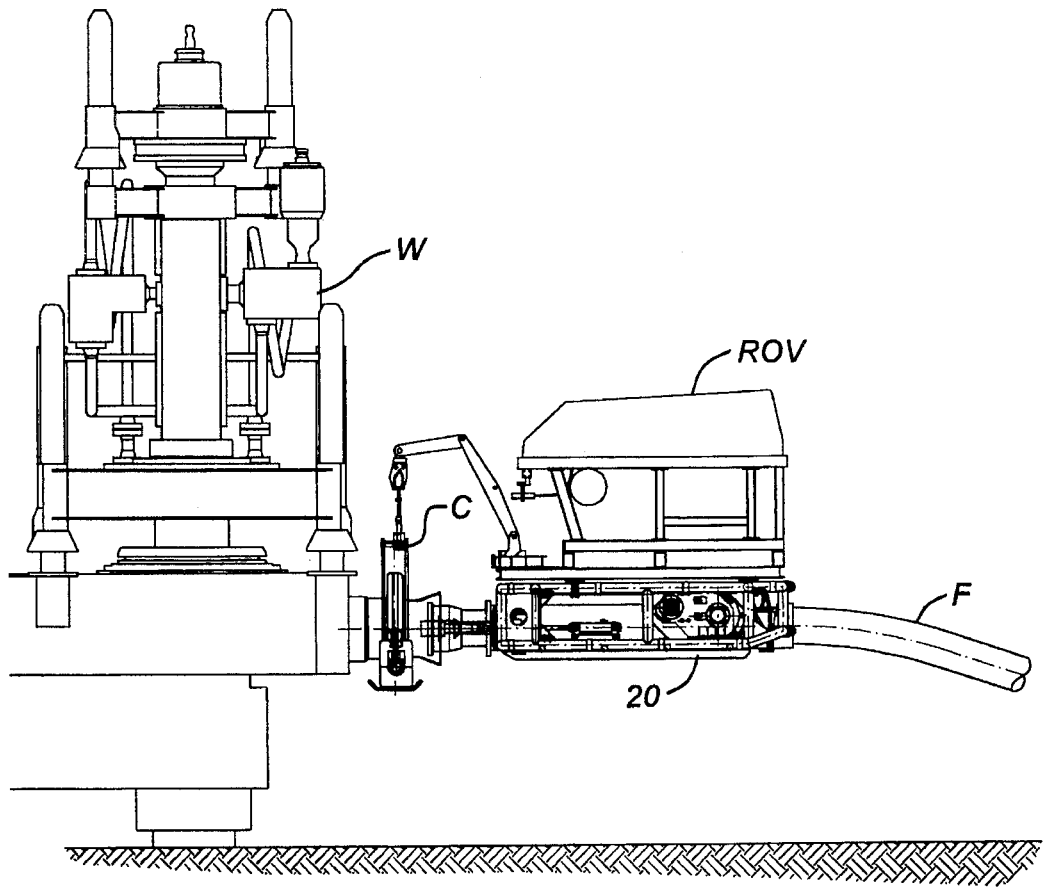
Figure 12:
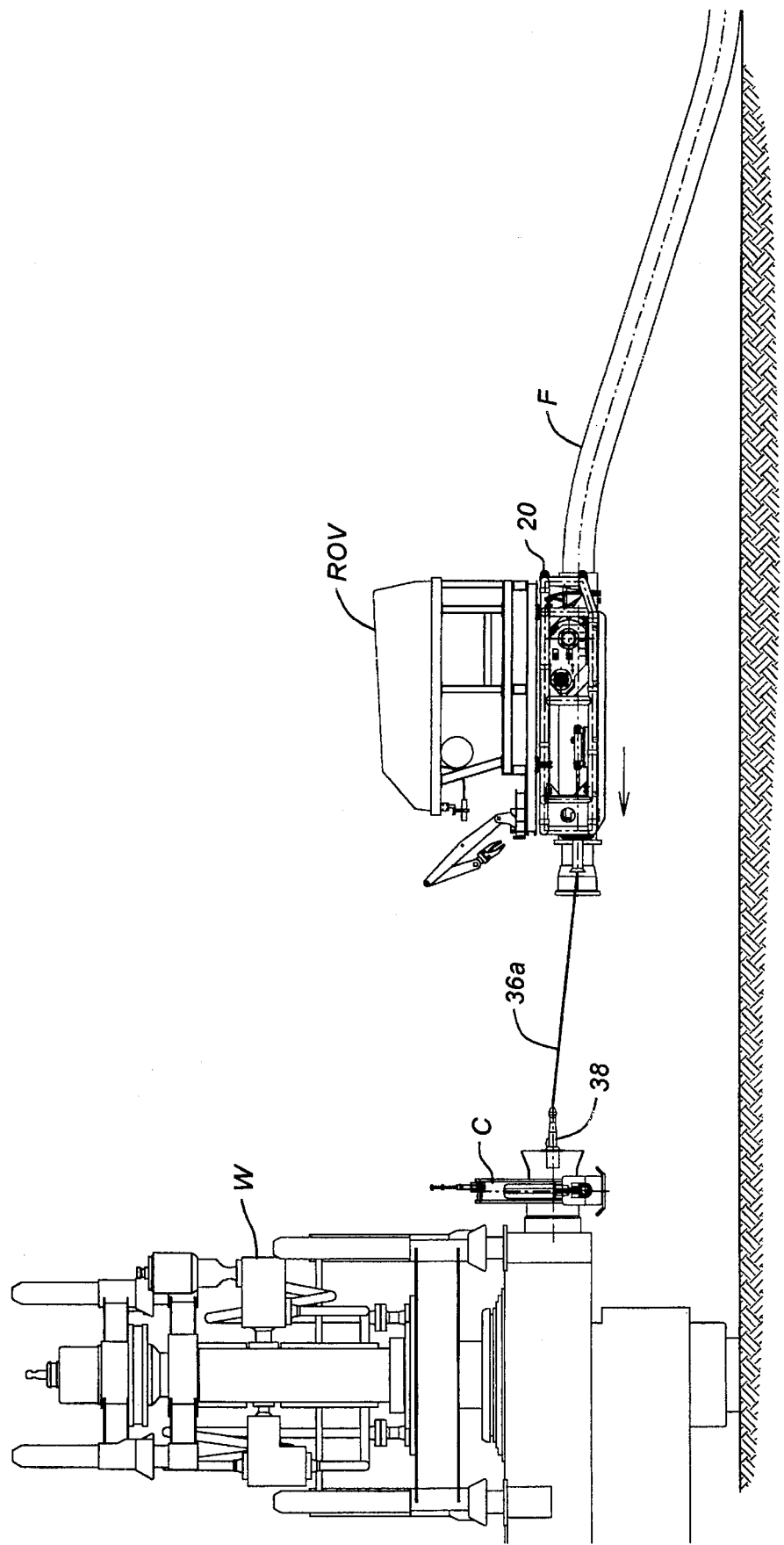
Figure 14:
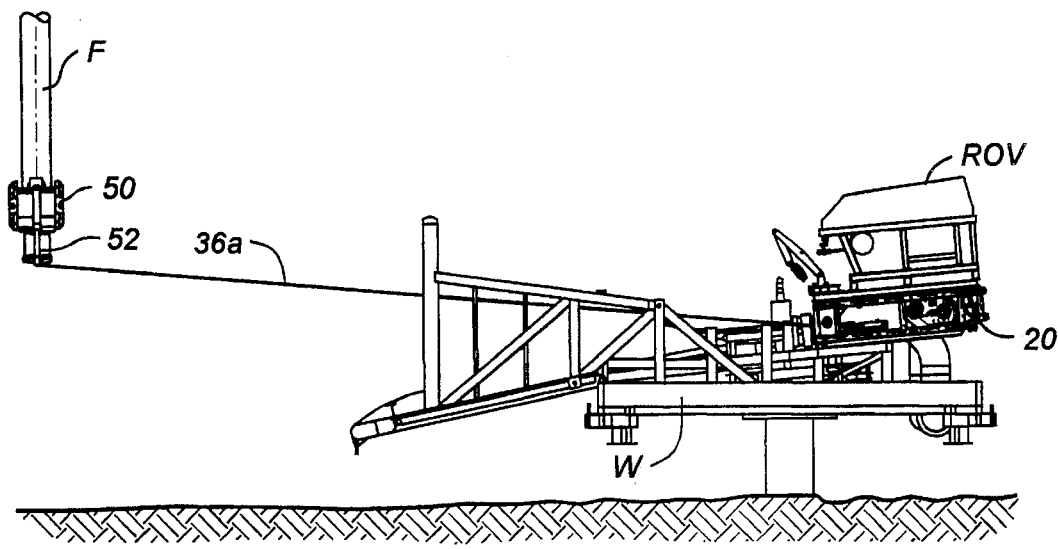
Figure 15:
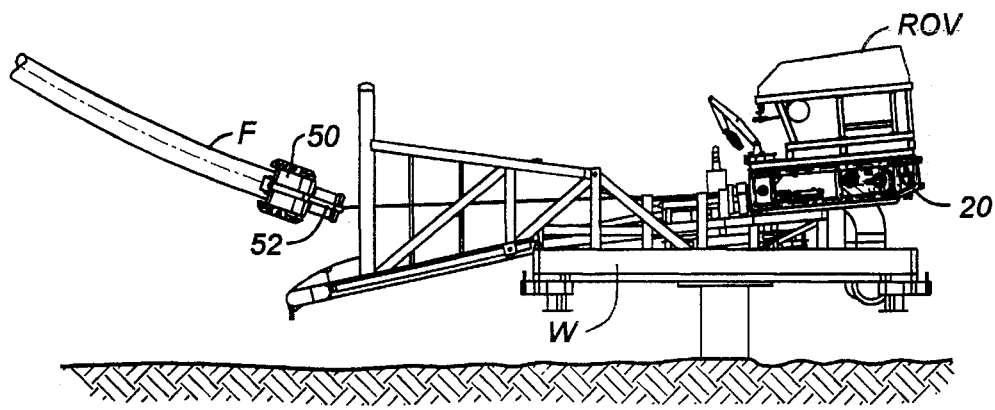
Figure 16:
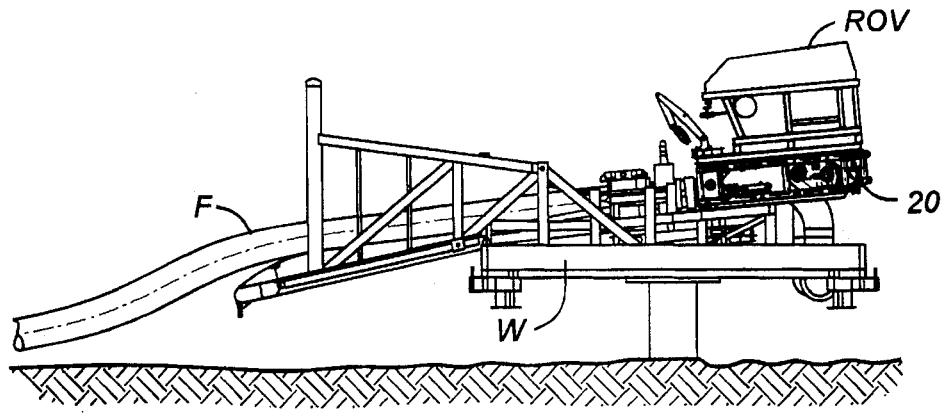

FIGS. 3–5 are end elevational views of the DFCS module, showing the modular design of the DFCS module to accommodate various flowline diameters;

FIG. 6 is an end elevational view of the clamp arm assembly;

FIG. 7 is an elevational view of the winch line guillotine and pinch roller assembly;

FIG. 8 is a view taken along line 8—8 of FIG. 7;

FIG. 9 is a diagrammatic view showing the ROV with the DFCS module docking the stab in anchors to the manifold;

FIG. 10 is a diagrammatic view showing the ROV flying to the flowline while paying out the DFCS winch lines;

FIG. 11 is a diagrammatic view showing the DFCS clamping onto the flowline;

FIG. 12 is a diagrammatic view showing the ROV with DFCS and flowline pulling-in to the connector by reeling in the DFCS winch lines;

FIG. 13 is a diagrammatic view showing the final make-up of the flowline into the connector; and FIGS. 14–16 are diagrammatic views showing a vertically deployed flowline being pulled in from a subsea structure.

DETAILED DESCRIPTION OF THE PREFERRED EMBODIMENT

Figure 1:
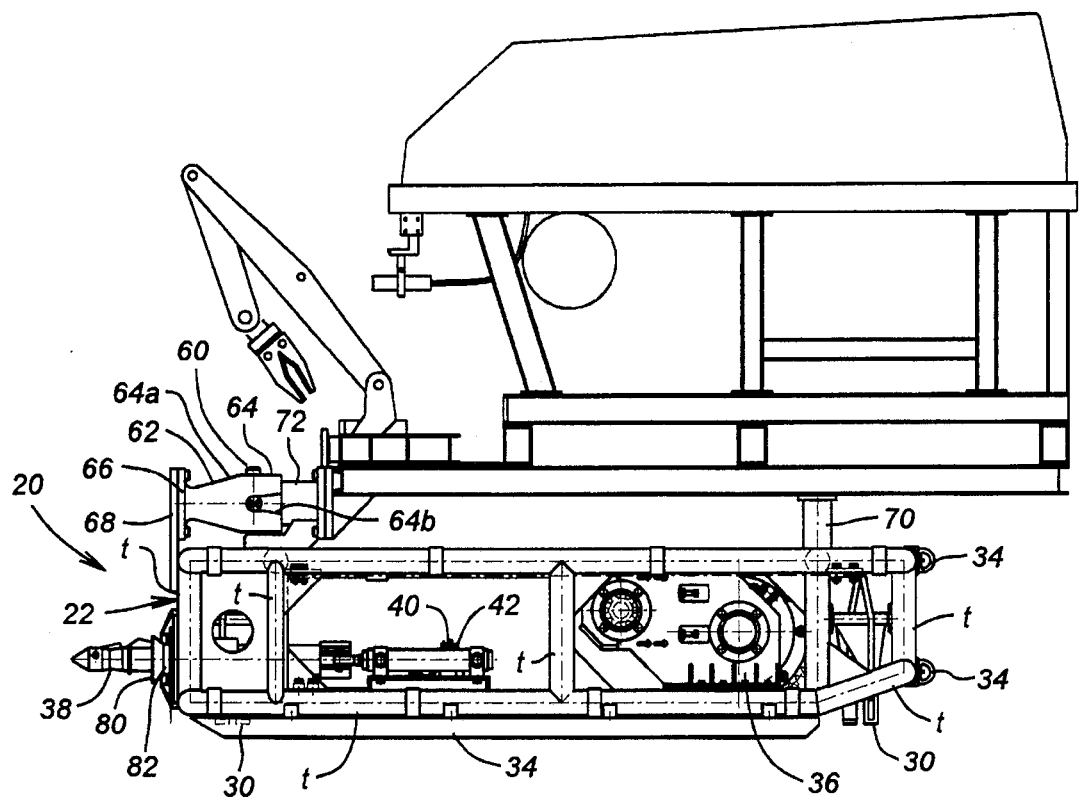
FIG. 1 is a side elevational view of the module of the diverless flowline connection system (DFCS) according to the present invention attached to a remotely operated vehicle.
Figure 2:
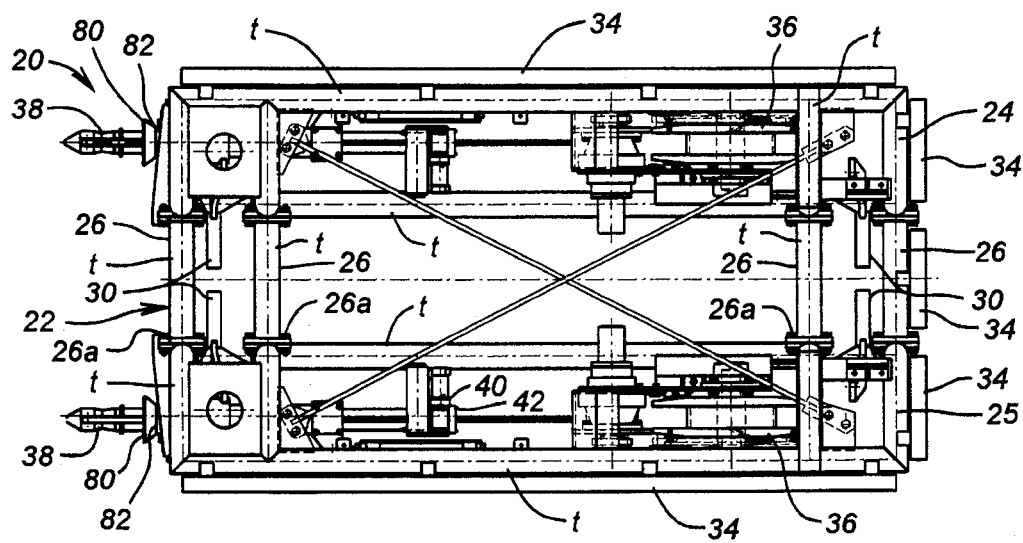
FIG. 2 is a top plan view of the DFCS module.

Referring to FIGS. 1 and 2, the diverless flowline connection system (DFCS), designated generally as 20, includes a modular skid frame assembly 22. Preferably, the modular skid frame assembly 22 is assembled from tubular members t for buoyancy considerations as will be explained below.

Referring to FIGS. 2–5, the skid frame assembly 22 is modular and comprised of a pair of outer frames, individually referred to as 24 and 25, joined to a plurality of center pup assemblies 26. The outer frames 24 and 25 are mirror images of one another. The pup assemblies 26' (FIG. 3), 26" (FIG. 4) and 26''' (FIG. 5) are designed to accommodate various ranges of flowline diameters. For example, pup assembly 26' may be designed for diameters ranging from 2"–12", pup assembly 26" for diameters ranging from 8"–18", and pup assembly 26''' for diameters ranging from 12"–20". The pup assemblies 26 are simply removed and replaced by removing a plurality of bolts 26a (FIG. 2). Since flowline size varies for each different subsea development, the modular design provides increased capability of being used on a large number of subsea developments.

As shown in FIG. 2, a plurality of pup assemblies 26 are used to join the outer frames 24 and 25. In the preferred embodiment as shown in FIG. 2, four pup assemblies 26 are required. Referring to FIGS. 3–5, the pup assemblies 26 include an upper saddle 28 for receiving the upper portion of the flowline F. Each saddle 28 is sized according to the range of diameters it is to accommodate. Similarly, the width of the pup assemblies 26 increases as the flowline diameters increase. It is to be appreciated that the overall width of the skid frame assembly 22 is kept to a minimum based on the diameter of the flowline F as a result of the modular design. This results in improved handling and maneuverability of the DFCS 20.

Referring to FIG. 6, a pair of clamp arms 30 are mounted on pivot pins 32. The pair of clamp arms 30 are hydraulically actuated and have a hydraulic cylinder 33 pivotally connected between the upper ends 31 of the clamp arms 30. As shown in FIG. 6, the clamp arms are allowed to move through an arc 35 about the pivot pins 32. The clamp arms 30 enable the DFCS 20 to clamp onto the end of the flowline F or onto the structure of the wellhead. The clamp arms 30 allow the DFCS 20 to be vertically lowered onto the flowline F. Once the DFCS 20 is positioned onto the flowline F, the hydraulics are activated to pivot the clamp arms 30 until they grippingly engage the flowline F. The clamp arms 30 extend low enough to enable the clamp arms 30 to lift the flowline F out of the mud or sand, if necessary. In the event of hydraulic system failure, the clamp arms 30 can be activated to release the flowline F. For example, if the hydraulics are lost on the ROV, the hydraulic circuit to the clamp arms 30 is opened to vent back into a hydraulic tank (not shown) which allows the clamp arms 30 to release the flowline F.

Referring to FIGS. 3 and 4, the outer frames 24 and 25 each include the pivotal clamp arms 30 mounted on the pivot pins 32. In FIG. 5, the pup assembly 26''' includes pivotal clamp arms 30' which rotate about pivot pins 32'. The clamp arms 30 have been removed from the outer frames 24 and 25. The clamp arms 30' are hydraulically actuated and function as the clamp arms 30 described above.

Preferably, the outer frames 24 and 25 and the pup assemblies 26 are assembled from tubular members t which are water-tight to provide the modular skid frame assembly 22 with supplemental buoyancy. Preferably, isolation compartments (not shown) are formed within the tubular members t to minimize the loss of buoyancy should any tubular member t flood. Although not shown, the DFCS 20 also includes buoyant foam attached to the skid frame assembly 22 to provide the DFCS with a net overall positive buoyancy.

Referring to FIGS. 1–5, wood and/or rubber bumpers 34 are attached to the perimeter and underside of the skid frame assembly 22 to prevent damage to the tubular members t.

Referring to FIGS. 1 and 2, the DFCS 20 includes a pair of winches 36 attached to a pair of stab-in anchors 38. The winches 36 are on opposed sides of the flowline F in a horizontal plane. The winches 36 are subsea winches and each winch 36 is independently controlled. Preferably, the winches 36 each have a full-drum pull capacity of approximately 5 metric tons and a maximum line speed of approximately 0.15 m/sec. Preferably, the maximum usable capacity of the winch 36 is in excess of 60 meters. The winch line 36a (FIG. 10) is preferably light-weight. In the preferred embodiment, the winch line 36a is a soft kevlar line for reasons which will be explained below.

It is to be understood that the ROV is controlled from the water surface, as for example from a floating vessel, and the various ROV controls are well known to one of ordinary skill in the art. As explained above, the DFCS 20 utilizes the ROV hydraulic power unit with only hydraulic hoses as the power/control interface between the ROV and the DFCS 20. Thus, the hydraulics of the DFCS 20 are controlled through the ROV controls.

The stab-in anchors 38 enable final alignment of the flowline F and to connect the winch lines 36a to the receptacles located either side of the connector or the pull-in head (depending on the tie-in method as will be described below). The ends of the winch lines 36a are connected to the stab-in anchors 38. The stab-in anchors 38 can be removed by an ROV manipulator in the event of a DFCS failure.

Referring to FIGS. 1 and 2, a damper/alignment assembly 80 is provided at the front end of the DFCS 20. The damper/alignment assembly 80 includes slide tubes 82 mounted in the outer frames 24 and 25. The slide tubes 82 are allowed to travel a distance of approximately 12 inches forward of the outer frames 24, 25 as shown in FIGS. 9–12. The slide tubes 82 are hydraulically actuated. The slide tubes are adapted interiorly to receive and lock with a mating portion 38a (FIG. 11) of the stab-in anchor 38. The locking of the stab-in anchor 38 with the slide tube 82 is hydraulically controlled.

Referring to FIGS. 1, 2, 7 and 8, the DFCS 20 includes winch line guillotines 40 and pinch rollers 42. The DFCS 20 incorporates guillotines 40 on the two winch lines 36a as a contingency against loss of system power. An accumulator (not shown) is included in the hydraulic system for the guillotines 40. The accumulator stays charged under normal hydraulic pressure operating conditions. In the event of loss of system power, the accumulator activates a hydraulic ram (not shown) which forces a guillotine blade 41 through the winch line 36a and against an anvil (not shown). In this event, the two winch lines 36a will be cut leaving the DFCS 20 free to be recovered. This, coupled with the release of the clamp arms 30, allows the DFCS 20 to be simply removed from the flowline F in case of ROV hydraulic system failure by lifting the DFCS 20 or DFCS 20 and ROV assembly using a separate lifting source.

Referring to FIG. 7, each winch line 36a passes through a pair of pinch rollers 42 that maintain a small tension on the winch line 36a to/from the winch 36. This feature prevents "birdcaging" of the winch line 36a in the event of the winch line 36a going slack during ROV/DFCS free-flying maneuvers. The tension is maintained whether line is being payed out or reeled in.

As indicated above, the winch line 36a is preferably a soft kevlar line to minimize weight, allow the use of the constant tension pinch rollers 42, and to allow severance by the failsafe guillotine 40.

The DFCS 20 includes a hydraulic system which utilizes the ROV hydraulic power and control valves, and therefore only requires hydraulic connection between the ROV and DFCS 20 for full function. Preferably, the hydraulic connection between the ROV and DFCS 20 is performed with the aid of a 16-port hydraulic hot stab (not shown). A 16-port hydraulic hot stab is commonly used with an ROV and is well known by one skilled in the art. The multi-port hot stab is connected to the DFCS 20 by the ROV manipulator. The hot stab requires no insertion force and permits such limited amounts of water ingress that no intermediate system is required to isolate the ROV hydraulic supply from the multi-port hot stab.

Preferably, the mechanical connection between the ROV and the DFCS is made by the use of a docking probe assembly 60 as shown in FIG. 1. The docking probe assembly 60 includes a receiver 62 located substantially midway between the outer frames 24 and 25 at the front end of the DFCS 20. The docking probe receiver 62 includes a tubular housing 64 having an inwardly tapering first end 64a and a generally peripheral flange 66 with a plurality of holes (not shown) for bolting the receiver 62 to a receiver plate 68. The receiver plate 68 is secured to the front pup assembly 26. The tubular housing 64 includes a pair of opposing slots 64b having a slight outward taper. A plug member 72 adapted to mate with the docking probe receiver 62 is mounted to the front end of the ROV.

Referring to FIG. 1, a rear stanchion 70 extends upwardly from the rear portion of the DFCS 20. As stated above, the DFCS 20 has a positive buoyancy. When the ROV mounts to the docking probe receiver 62 at the front end of the DFCS 20, the rear stanchion 70 bears against a lower surface of the ROV due to the positive buoyancy of the DFCS 20.

The docking probe assembly, in conjunction with the multi-port hot stab, enables the ROV to separate from the DFCS to perform any required ancillary or contingency operations without the need for a second ROV. Preferably, failsafe hydraulics are provided to allow for the separation of the ROV from the DFCS 20 in the event of vehicle failure.

Referring to FIGS. 9–13, the basic operational sequence for pulling from the flowline end towards the wellhead connection is described as follows. First, the flowline F is placed on the seabed within a fixed distance of the wellhead connection C.

The ROV with the DFCS 20 mounted thereto flies to the connection C and stabs the DFCS stab-in anchors 38 into female receptacles mounted on either side of the connection C. This action anchors the ends of the two DFCS winch lines 36a to the subsea wellhead W. Referring to FIG. 10, the ROV activates the DFCS winches 36 to pay out the winch lines 36a as the ROV flies backward toward the flowline F. Referring to FIG. 11, the ROV lands the DFCS 20 over the flowline F and activates the clamp arms 30. This locks the DFCS 20 and ROV onto the flowline F. The winches 36 are activated to commence pulling the flowline F up to the subsea wellhead W. The dual winch system and the independent controls of the DFCS 20 permit controlled application of a moment on the flowline to assist in the alignment of the flowline F with the connector C on the wellhead or subsea structure W. This allows the DFCS 20 to laterally adjust the position of the flowline and the DFCS 20 as it approaches the wellhead W. This lateral movement is in addition to that which can be supplied using the thrusters on the ROV.

The DFCS winches 36 continue to pull the flowline F up to the wellhead connection C until the flowline F is approximately 300 millimeters from the connector C. The final 300 millimeters of pull-in is performed with the winches and hydraulic damper/alignment assemblies. This provides a control method of aligning the flowline hub as it enters the connector, minimizing potential damage of the hub and flange faces.

The dual winch system of the DFCS 20 allows for a balanced pull force through the center of the flowline F which will not put a moment on the flowline F during final pull-in, as the winches 36 are substantially vertically aligned with the center of the flowline F and the winches 36 are controlled during the final pull-in to provide no horizontal moment. The locking of the stab-in anchors 38 with the damper/alignment assemblies 80 allows the final pulling in of the flowline F to be performed hydraulically by retrieving the sliding tubes 82 back to their retracted positions.

It is to be understood that in the method described above (pull from flowline end), the DFCS 20 is an integral part of the ROV throughout the complete pull-in operation.

In the method of pulling the flowline F from the subsea structure W, the ROV locates the DFCS 20 onto a part of the wellhead structure W and pulls the flowline F in from this position. There are two variations to this arrangement: (1) the flowline F is lowered vertically (FIG. 14) from the support vessel (not shown), tied in and then laid away, or (2) the flowline F is first laid on the seafloor and then the connection is made.

Referring to FIGS. 14–16, the basic operational sequence is as follows. The DFCS 20 is lowered in a deployment frame/equipment basket (not shown) to the seafloor. The ROV docks onto the DFCS 20 and transports it to its operating position on the subsea structure W. Referring to FIG. 14, a flowline pull-in head 50 is mounted on the end of the flowline F. The pull-in head 50 provides a means to connect the stab-in anchors 38 to the end of the flowline F and guides to assist in the final alignment of the flowline at the subsea structure W. Referring to FIG. 14, the flowline F and the pull-in head 50 are vertically lowered to the target zone at the seafloor (approximately 60 meters from the subsea structure W) and held for the DFCS winch lines 36a to be connected to it.

The ROV undocks from the DFCS 20 and with the ROV manipulator, takes the stab-in anchors 38 from their socket on the DFCS 20. The stab-in anchors 38 with attached winch lines 36a are flown and docked to a socket 52 held by the flowline pull-in head 50.

The ROV flies back to the DFCS 20 and redocks onto it, using its multi-port hot stab to operate the DFCS hydraulic functions. The ROV powers the DFCS winches 36 to pull the flowline F in until it rests on the pull-in ramp. The flowline is pulled in until the flanges are fully made up, confirmed visually by a micro camera (not shown) mounted to the manipulator forearm.

The pull from subsea structure configuration has the following benefits over the pull from flowline end configuration. In the pull from subsea structure configuration, the DFCS 20 is not an integral part of the ROV. Without the excess bulk of the DFCS 20 the ROV can be easily maneuvered and can readily attend to other work tasks as required. In the pull from flowline end configuration, the flowline can be manipulated and pulled on by each or both of the winches 36 resulting in the ability to pull in various directions. If necessary, the side thrusters of the ROV can also be utilized to alter the direction force on the flowline. Thus, in this configuration, better angular control of the flowline is available.

The foregoing disclosure and description of the invention are illustrative and explanatory thereof, and various changes in the size, shape and materials, as well as in the details of the illustrated construction may be made without departing from the spirit of the invention.

We claim:

1. A diverless flowline connection system for connection to a remotely operated vehicle, the diverless flowline connection system for connecting a flowline to a subsea wellhead at a subsea structure, the diverless flowline connection system comprising:

a frame assembly;

means for clamping said frame assembly to the subsea structure or flowline; and means for releasing said clamping means from the subsea structure or the flowline in the event of hydraulic system failure.

2. The system of claim 1, further comprising:

a winch mounted to said frame assembly, said winch including a winch line; and a guillotine for severing said winch line in the event of hydraulic system failure.

3. The system of claim 1, wherein said means for clamping comprises:

a plurality of arms pivotally attached to said frame assembly, each said arm having an upper end and a lower end; and a hydraulic cylinder connected between said upper ends of said arms, wherein said lower ends of said arms are adapted to bear against the flowline or subsea structure.

4. The system of claim 1, further comprising a pair of winches mounted to said frame assembly, each said winch including a winch line.

5. The system of claim 4, further comprising independent controls for said winches so that the lateral position of the flowline may be variously adjusted by controlling each of said winches.

6. The system of claim 5, further comprising a guillotine for severing each said winch line in the event of hydraulic system failure.

7. A diverless flowline connection system for connection to a remotely operated vehicle, the diverless flowline connection system for connecting a flowline to a subsea wellhead, at a subsea structure the diverless flowline connection system comprising:

a frame assembly;

means for clamping said frame assembly to the subsea structure or flowline;

a pair of winches mounted to said frame assembly, each said winch including a winch line;

independent controls for said winches so that the lateral position of the flowline may be variously adjusted by controlling each of said winches; and a guillotine for severing each said winch line in the event of hydraulic system failure.

8. A diverless flowline connection system for connection to a remotely operated vehicle, the diverless flowline connection system for connecting a flowline to a subsea wellhead at a subsea structure, the diverless flowline connection system comprising:

a frame assembly;

means for damping said frame assembly to the subsea structure or flowline;

a pair of winches mounted to said frame assembly, each said winch including a winch line; and a guillotine for severing each said winch line in the event of hydraulic system failure.

9. A diverless flowline connection system for connection to a remotely operated vehicle, the diverless flowline connection system for connecting a flowline to a subsea wellhead at a subsea structure, the diverless flowline connection system comprising:

a frame assembly;

a winch mounted to said frame assembly, said winch including a winch line; and a guillotine for severing said winch line in the event of hydraulic system failure.

10. The system of claim 9, further comprising:

a pair of clamping arms pivotally attached to said frame assembly, each said clamping arm having an upper end and a lower end; and a hydraulic cylinder connected between said upper ends of said clamping arms, wherein said lower ends of said clamping arms are adapted to bear against the subsea structure or flowline.

11. A diverless flowline connection system for connection to a remotely operated vehicle, the diverless flowline connection system for connecting a flowline to a subsea wellhead, the diverless flowline connection system comprising:

a modular frame assembly adapted to mount on the flowline, said modular frame assembly comprises:

a pair of outer frames; and a pup assembly connected between said pair of outer frames;

means for clamping said frame assembly to the flowline;

a pair of winches having winch lines for attachment to the wellhead to which the flowline is to be connected, one said winch mounted to each said outer frame; and independent controls for said winches so that the lateral position of the flowline may be variously adjusted by controlling each of said winches.

12. The system of claim 11, wherein said pup assembly has a width and the width of said pup assembly is dependent on the diameter of the flowline.

13. The system of claim 11, wherein said means for clamping comprises:

a pair of arms pivotally attached to said frame assembly, each said arm having an upper end and a lower end; and a hydraulic cylinder connected between said upper ends of said arms, wherein said lower ends of said arms are adapted to bear against the flowline.

14. The system of claim 13, wherein said arms are pivotally attached to said outer frames.

15. The system of claim 11, further comprising a guillotine for severing each said winch line in the event of hydraulic system failure.

16. The system of claim 11, further comprising means for releasing said clamping means from the flowline in the event of hydraulic system failure.

* * * * *

UNITED STATES PATENT AND TRADEMARK OFFICE
CERTIFICATE OF CORRECTION

PATENT NO. : 5,593,249
DATED : January 14, 1997
INVENTOR(S) : David S. Cox; Stephen M. Gates It is certified that error appears in the above-identified patent and that said Letters Patent is hereby corrected as shown below:

Column 8, line 29, "damping" should be --clamping--.

Signed and Sealed this

Thirteenth Day of May, 1997

Attest:

BRUCE LEHMAN

Attesting Officer     Commissioner of Patents and Trademarks